United States Patent
Mori

[11] Patent Number: 6,015,952
[45] Date of Patent: Jan. 18, 2000

[54] GROMMET AND METHOD FOR ARRANGING THE SAME AND USE THEREOF

[75] Inventor: Keisuke Mori, Yokkaichi, Japan

[73] Assignee: Sumitomo Wiring Systems, Ltd., Japan

[21] Appl. No.: 09/085,438

[22] Filed: May 27, 1998

[30] Foreign Application Priority Data

Jun. 9, 1997 [JP] Japan ..................... 9-150759

[51] Int. Cl.[7] .................................................. H02G 3/00
[52] U.S. Cl. ................... 174/72 R; 174/95; 174/152 G; 174/153 G; 16/2.1
[58] Field of Search ................ 174/72 R, 152 G, 174/65 G, 31 R, 65 R, 135, 95, 153 G; 16/2.1; 285/207, 174

[56] References Cited

U.S. PATENT DOCUMENTS

| | | | |
|---|---|---|---|
| 257,357 | 5/1882 | McGrew | 285/150.1 |
| 2,307,690 | 1/1943 | Lee | 403/186 |
| 2,311,427 | 2/1943 | Winkelmeyer | 16/108 |
| 2,933,550 | 4/1960 | Cole et al. | 174/76 |
| 4,248,459 | 2/1981 | Pate et al. | 285/319 |
| 5,227,585 | 7/1993 | Zen | 174/95 |
| 5,448,017 | 9/1995 | Nakajima et al. | |

FOREIGN PATENT DOCUMENTS 3-30715 of 1991 Japan.

OTHER PUBLICATIONS

Patent Abstracts of Japan—JP 07105775, Apr. 21, 1995.
Patent Abstracts of Japan—JP 06276642, Sep. 30, 1994.
Patent Abstracts of Japan—JP 06165340, Jun. 10, 1994.

*Primary Examiner*—Dean A. Reichard
*Assistant Examiner*—Dhiru R Patel
*Attorney, Agent, or Firm*—Anthony J. Casella; Gerald E. Hespos

[57] ABSTRACT

A grommet is provided to securely prevent a wire group from being exposed to water when it is arranged in a water exposure area in a vehicle and while being divided into two or more wire bundles. The grommet includes a conical large diameter portion 12 is provided at one end 11*a* of a cylindrical main tube 11 made of rubber or elastomer. The other end 11*b* of the main tube 11 is closed. Two cylindrical branch tubes 13, 14 project from the side surface of the main tube 11 in a direction substantially normal to the longitudinal direction of the main tube 11, and conical large diameter portions 13*a*, 14*a* are provided at the leading ends of the branch tubes 13, 14. Furthermore the present invention relates to a method for arranging such a grommet and an use thereof.

8 Claims, 5 Drawing Sheets

GROMMET AND METHOD FOR ARRANGING THE SAME AND USE THEREOF

BACKGROUND OF THE INVENTION

1. Field of the Invention

The present invention relates to a grommet for protecting a wire group from water, and particularly a wire group of an automotive vehicle where a single wire group is divided into two or more wire bundles. The grommet is designed to protect a wire group from water particularly when the wire group is arranged between a roof and a back door of a hatch-back type automotive vehicle in which a back door window can be opened and closed independently of the opening and closing movement of a back door. Furthermore the present invention relates to a method for arranging such a grommet and an use thereof.

2. Description of the Prior Art

A wire group for supplying power to a back door of a hatch-back type vehicle is used with a prior art grommet 5 as shown in FIG. 6. The prior art grommet 5 includes a narrow tube portion 5a through which the wire group is to be passed and conical large diameter portions 5b, 5c provided at the opposite ends of the narrow tube portion 5a. One large diameter portion 5b of the prior art grommet 5 is mounted in a through hole 2 formed in an end portion of a roof panel 1, and the other large diameter portion 5c thereof is mounted in a through hole 4 formed in a back door frame, as shown in FIGS. 7 and 8. A wire group W is arranged into the inside of a door through the through hole 2 of the roof panel 1, through the narrow tube portion 5a of the grommet 5 and through the through hole 4 of the back door frame 3.

In some hatch-back type vehicles, a back door window mounted on a back door can be opened and closed independently of the opening and closing movement of the entire back door. In such hatch-back type vehicles, a back door frame has a double structure as shown in FIG. 9. The wire group is arranged while being divided and inserted into a through hole 4a formed in a door main frame 3a of the back door and a through hole 4b formed in a door window holding frame 3b.

In this case, as shown in FIG. 10, grommets 10A, 10B, 10C are mounted in the respective through holes 2, 4a, 4b of the roof panel 1, the door main frame 3a and the window holding frame 3b, respectively. However, in a water exposure area (Y) between the roof panel 1 and the frames 3a, 3b of the back door, the wire group W is not covered by the grommet and, accordingly, there is a likelihood that water enters the inside of the roof or back door (inside the frame) by running between the wires of the wire group W. Thus, at the openings of the grommets 10A, 10B and 10C, a water stop material such as a hard resin is filled between the wires of the wire group W to fix the entire wire group. However, it takes a time and a high cost to fill the water stop material. Further, the water exposure area (Y) is visible from the outside and does not look nice because the wire group is exposed.

The present invention was developed in view of the above problems, and an object thereof is to securely prevent a wire group from being exposed to water when being arranged, preferably while being divided into two or more wire bundles in a water exposure area in a vehicle.

SUMMARY OF THE INVENTION

According to the invention, there is provided a grommet for a connection with at least two members being preferably displaceable with respect to each other. The grommet has a branch construction comprising a main tube through which a wire group is passed or passable. The main tube is branched into at least two branch tubes, wherein the main tube and each of the branch tubes comprise connection portions at their leading ends.

Accordingly, there is provided a grommet in which the main tube is connectable to a first member and the two or more branch tubes are connectable to at least a second member or preferably to second and third members, such that one branch tube is connected with the second member and the other branch tube is connected with the third member.

According to a preferred embodiment, each connection portion comprises a conical large diameter portion being formed at the leading ends of each of the two or more branched tubes and the main tube, respectively.

Preferably, the grommet has a branch construction in which a tube through which a wire group is passed is branched into at least two tubes. A conical large diameter portion is formed at the leading ends of each of the two or more branched tubes and the main tube and the conical large diameter portions are fitted or fittable into through holes of a member on which the grommet is mounted. With the grommet thus constructed, the conical large diameter portions at the leading ends of the main tube and the two or more branch tubes are fitted or fittable into the through holes of the member on which the grommet is mounted with the wire group passed through the respective tubes. Accordingly, the wire group can be securely protected from water even in the case that it is arranged in a water exposure area in a vehicle while being divided into wire bundles.

The grommet may be used for arranging a wire group from a roof to a back door of a hatch-back type vehicle, and preferably a vehicle in which a back door window can be opened and closed independently from the opening and closing movement of the back door. The two branch tubes may project from a side surface of the main tube. At least the main tube of the grommet may be made of rubber or elastomer. One end of the main tube may be formed with the connection portion having preferably the conical large diameter portion and the other end of the main tube may be closed. A wire group is arranged or arrangeable through the main tube and through the two branch tubes while dividing the wire group into two wire bundles.

The above grommet is or may be used for arranging a wire group from a roof to a back door of a hatch-back type vehicle in which a back door window can be opened and closed independently from the opening and closing movement of the back door. The branch tubes may project from the side surface of the main tube which is made of rubber or elastomer. The main tube may have one end formed into a conical large diameter portion and the other end closed. Conical large diameter portions also are formed at the leading ends of the two branch tubes. A wire group may be arranged from the roof to the back door by fitting the conical large diameter portion formed at one end of the main tube into a through hole formed in a roof panel. The wire group then is pulled out of the through hole through the main tube and pulling it out through the openings at the leading ends of the two branch tubes while dividing the wire group into two wire bundles. The conical large diameter portions at the leading ends of the two branch tubes are fit into through holes formed in a door main frame of the back door and a glass retaining frame.

With this construction, the wire group can be arranged from the roof to the back door without being exposed to water in a water exposure area between the roof and the back door in the hatch-back type vehicle in which the back door window can be opened and closed independently of the opening and closing movement of the back door.

The main tube and the at least two branch tubes may be separately formed. Thus the main tube may comprise two or more junction tubes projecting from a surface of the main tube. Two joint members, preferably made of a resin tube, may be fitted into the leading end of each of the at least two junction tubes. The distal or rear end of each branch tube may have the above described connection portion, and preferably the conical large diameter portion formed at the leading end thereof around the corresponding joint member.

Preferably, a part of the main tube is formed into a corrugated portion arranged between its connection portion and the at least two branch tubes and preferably extending over substantially its full longitudinal extension. By doing so, the grommet can undergo a deformation according to the opening and closing operation of the back door and the back door window. This prevents the conical large diameter portions of the grommet from being disengaged from the main frame of the back door and the glass retaining frame.

Preferably, the main tube and the two branch tubes are separately formed and are connected by forming two relatively short junction tubes that project from the side surface of the main tube, fitting one end of a joint member made of a resin tube into the leading end of each of the two junction tube, and fitting the rear end of each branch tube having the conical large diameter formed at the leading end thereof around the corresponding joint member.

With such a grommet, after the wire group is passed through the main tube, and the wire bundles are pulled out through the openings at the ends of the joint members and passed through the branch tubes, the branch tubes can be connected with the joint members. Therefore, the wire group can be passed more easily through the grommet.

According to a further preferred embodiment, at least part or one of the junction tubes projecting from the side surface of the main tube and the corresponding branch tubes have the same elliptical or oblong cut section. Additionally the corresponding connection portions at the leading ends of the corresponding branch tubes are so formed as to be widened along a direction at an angle different from 0° or 180°, preferably substantially normal to the longitudinal axes of the branch tubes.

Such a grommet can be assembled easily such that the widening direction of the conical large diameter portions of the branch tubes and that of the conical large diameter portion of the main tube have a specified relationship.

According to the invention, there is further provided a method for arranging a grommet according to one or more of the preceding claims for connecting at least two members, that are displaceable with respect to each other. The method comprises the steps of connecting the main tube to the first member and connecting the branch tubes to the second member, preferably separately to the second and the third member being displaceable with respect to each other.

Accordingly, the wire group arranged in the water exposure area of the vehicle while being divided can be covered by the grommet. Thus, the wire group can be securely protected from water.

According to a preferred embodiment, the method further comprises the step of arranging a wire group from the first member, preferably a roof, to the second member, preferably a back door of a hatch-back type vehicle. A third member, preferably a back door window is displaceable independently from the movement of the second member. Thus the back door window preferably can be opened and closed independently from the opening and closing movement of the back door. The method further includes fitting the connection portion, preferably the conical large diameter portion formed at one end of the main tube into a through hole formed in the first member, preferably a roof panel. The method continues by passing the wire group pulled out of the first member through hole through the main tube and pulling it out through openings at the leading ends of the two branch tubes while dividing the wire group into two wire bundles. The method may conclude by fitting the connection portions, preferably the conical large diameter portions at the leading ends of the two branch tubes, into through holes formed in the second and third members, preferably in a door main frame of the back door and a glass retaining frame.

Accordingly, the wire group can be arranged from the roof to the back door without being exposed to water in a water exposure area between the roof and the back door in the hatch-back type vehicle in which the back door window can be opened and closed independently of the opening and closing movement of the back door.

Preferably, the method further comprises the steps of: separately forming the main tube and the at least two branch tubes and connecting them by forming at least two relatively short junction tubes projecting from a surface of the main tube. The method continues by fitting one end of at least two joint members preferably made of a resin tube into the leading ends of the respective junction tubes. The method may proceed by fitting the rear end of each branch tube having the connection portion, preferably the conical large diameter portion formed at the leading end thereof around the corresponding joint member.

These and other objects, features and advantages of the present invention will become more apparent upon a reading of the following detailed description and accompanying drawings.

DETAILED DESCRIPTION OF THE PREFERRED EMBODIMENT

Figure 1:
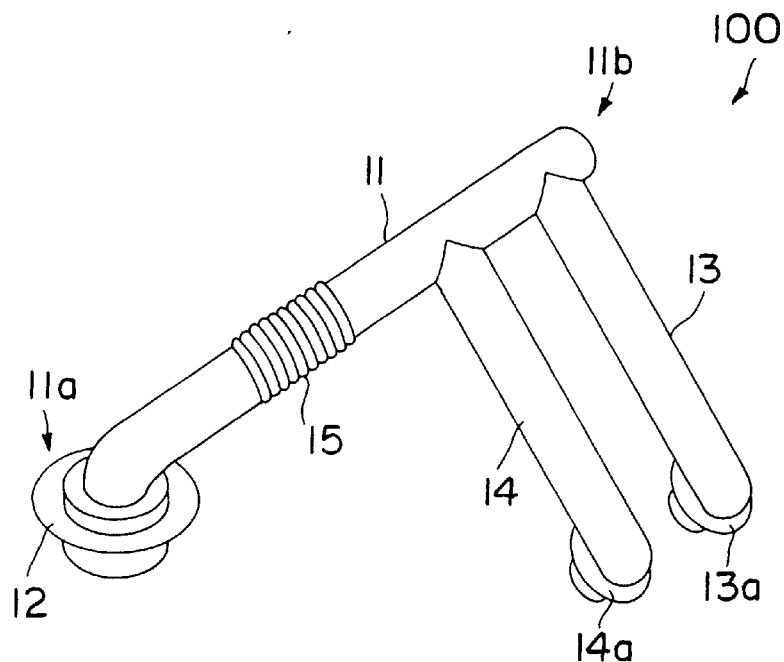
FIG. 1 is a perspective view of a grommet according to a first embodiment.

FIG. 1 shows a grommet according to a first embodiment for protecting a bundle of wires from water. The wires may be arranged e.g. from a roof side to a hatch-back door having a window which can be opened and closed independently from the opening and closing movement of the back door.

A grommet 100 is made, for example, of rubber or elastomer. A substantially conical large diameter portion 12 (connection portion) is provided at one end 11a of a substantially cylindrical main tube 11, and the other end 11b of the main tube 11 is or may be closed. Two substantially cylindrical branch tubes 13, 14 project from the side surface of the main tube 11 in a direction at an angle different from 0° or 180°, and preferably substantially normal to the longitudinal direction of the main tube 11. Substantially conical large diameter portions 13a, 14a (connection portions) are provided preferably at the leading ends of the branch tubes 13, 14. The conical large diameter portion 12 provided at the end 11a of the main tube 11 is formed into a flange. Further, a corrugated portion 15 is provided at a part of the main tube 11, preferably between the large diameter portion 12 and the branch tubes 13, 14, so as to permit a loose movement of the main tube 11.

The conical large diameter portions 13a, 14a at the leading ends of the branch tubes 13, 14 are widened such that the openings at the leading ends thereof face in a direction at an angle different from 0° or 180°, preferably substantially normal to the longitudinal direction of the branch tubes 13, 14. The widening direction (opening direction) of the conical large diameter portions 13a, 14a are substantially same as the widening direction (opening direction) of the conical large diameter portion 12 of the main tube 11.

Figure 2:
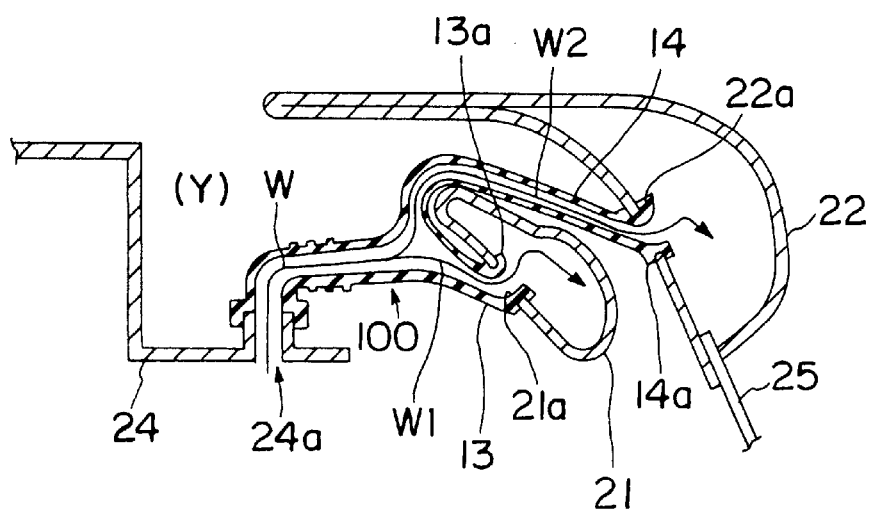
FIG. 2 is a schematic section of an arrangement construction of a wire group using the grommet of FIG. 1.

FIG. 2 shows a wire group arranged from a roof side to a back door using the grommet 100. The large diameter portion 12 in the form of a flange at one end of the main tube 11 of the grommet 100 is fitted to a projecting rim of a through hole 24a formed in a roof panel 24, whereas the large diameter portions 13a, 14a at the leading ends of the branch tubes 13, 14 are fitted into through holes 21a, 22a formed in a door main frame 21 and a door glass retaining frame 22, respectively.

A wire group W is inserted or insertable into the main tube 11 through the through hole 24a of the roof panel 24 and is divided preferably into wire bundles W1, W2, which are passed through the branch tubes 13, 14 and pulled out through the through hole 21a of the door main frame 21 and the through hole 22a of the frame 22 for retaining a door glass 25. In this way, the wire group W is arranged from the roof side to the back door. Thus, the wire group W is covered by the grommet 100 in a water exposure area (Y) between the roof panel 24 and the frames 21, 22 of the back door and is protected completely from water.

Further, since the grommet 100 is made e.g. of rubber or elastomer and since the main tube 11 is permitted to make a loose movement because of the corrugated portion 15, the grommet 11 undergoes a deformation as the back door or the back door window is opened and closed. Accordingly, there is no likelihood that the respective large diameter portions 12, 13a, 14a of the main tube 11 and the branch tubes 13, 14 will become disengaged from the roof panel 24 and the frames 21, 22 of the back door.

Figure 3:
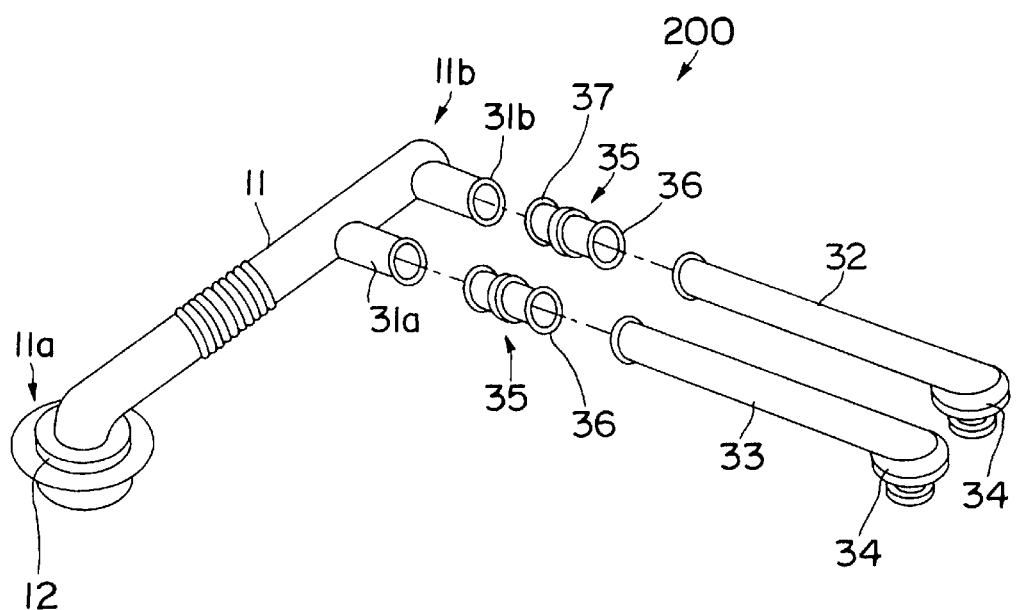
FIG. 3 is a perspective view of a grommet according to a second embodiment.

FIG. 3 shows a grommet 200 according to a second embodiment. The grommet 200 is constructed as follows. Two relatively short preferably cylindrical junction tubes 31a, 31b project from the side surface of a cylindrical main tube 11 made of rubber or elastomer. Branch tubes 32, 33, which may be made of rubber or elastomer, each are formed with a substantially conical large diameter portion 34 at one end. The branch tubes 32, 33 are connected with the leading ends of the two junction tubes 31a, 31b via joint members 35, each of which is formed of a material having a stiffness or rigidity that preferably is higher than that of the main tube 11 and/or the branch tubes 13, 14, e.g. of a resin cylindrical tube.

Elongated and preferably circumferentially continuous projections 36, 37, 38 are formed on the outer surface of the joint member 35 at the substantially opposite ends and substantially in the middle with respect to the longitudinal direction of the joint member 35, respectively. The outer diameter of the joint member 35 at one end is slightly larger than the inner diameter of the branch tube 32 (33). This, together with the projection 36 formed at this end, makes the branch tube 32 fitted around the joint member 35 unlikely to come off and substantially seleangly engaged. The outer diameter of the other end of the joint member 35 is larger than the inner diameter of the junction tube 31a (31b). This, together with the projection 37 formed at this end, makes the junction tube 31a (31b) fitted around the joint member 35 unlikely to come off. The projection 38 formed substantially in the middle of the joint member 35 along the longitudinal direction is a stopper for restricting the insertable length of the joint member 35 into the branch tube 32 (33) and the junction tube 31a (31b).

Figure 4A:
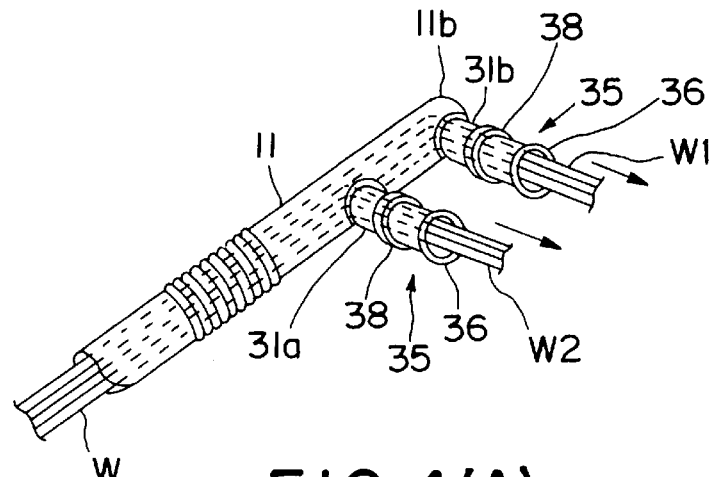
FIGS. 4(A) and 4(B) are perspective views showing an operation of inserting a wire group into the grommet of FIG. 3.
Figure 4B:
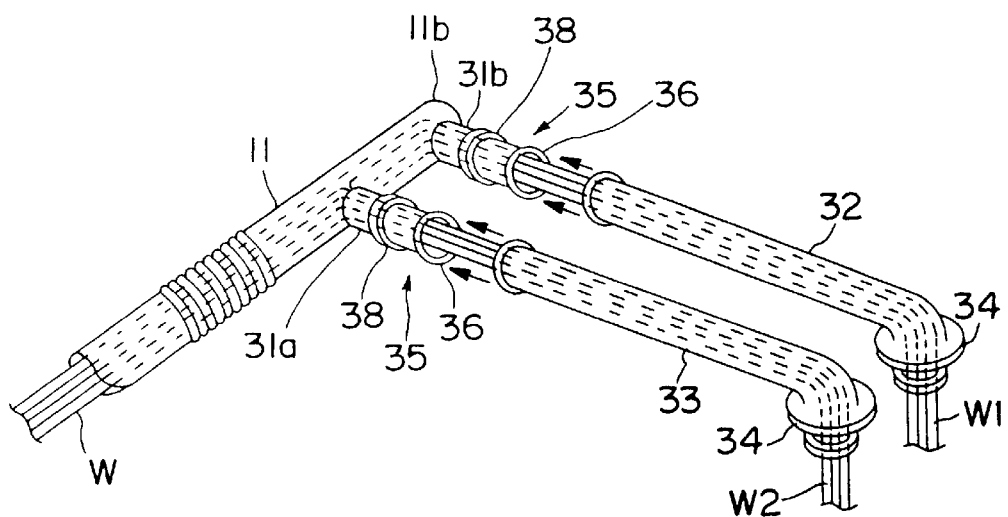

In the grommet 200, as shown in FIG. 4(A), a wire group W inserted or insertable into the main tube 11 is pulled out through the cylindrical junction tubes 31a, 31b while being divided into wire bundles W1, W2 before the branch tubes 32, 33 are mounted. The joint members 35 then are fitted into the junction tubes 31a, 31b. Thereafter, as shown in FIG. 4(B), the wire bundles W1, W2 are inserted or insertable into the branch tubes 32, 33 and pulled out through the openings at the leading ends of the conical large diameter portions 34 at one end of the branch tubes 32, 33 and, then, the other ends of the branch tubes 32, 33 are fitted around the joint members 35. Accordingly, as compared with the grommet 100 of the first embodiment in which the main tube and the branch tubes are integral or unitary, the wire group W can be more easily passed through the grommet 200.

Figure 5:
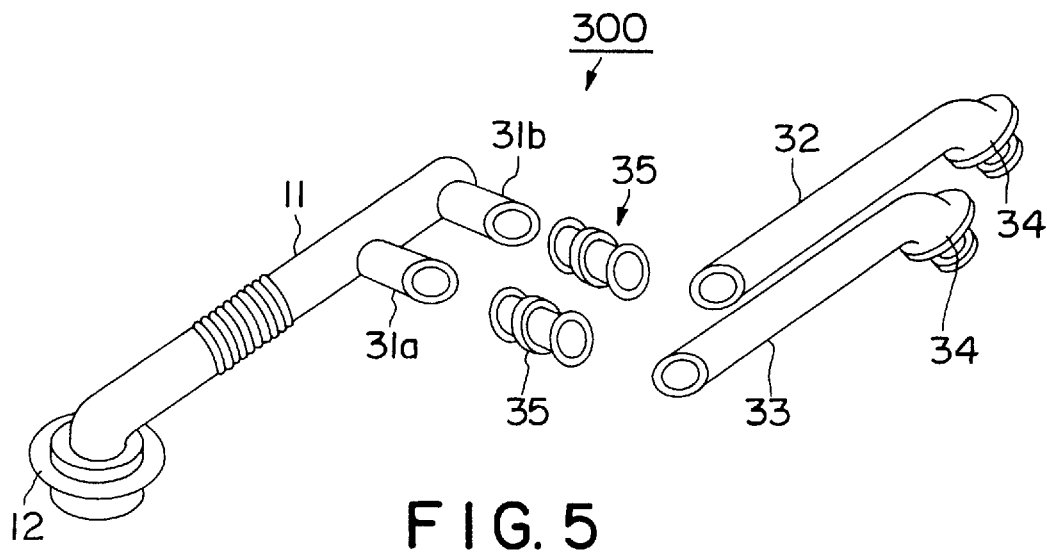
FIG. 5 is a perspective view of a grommet according to a third embodiment.
Figure 6:
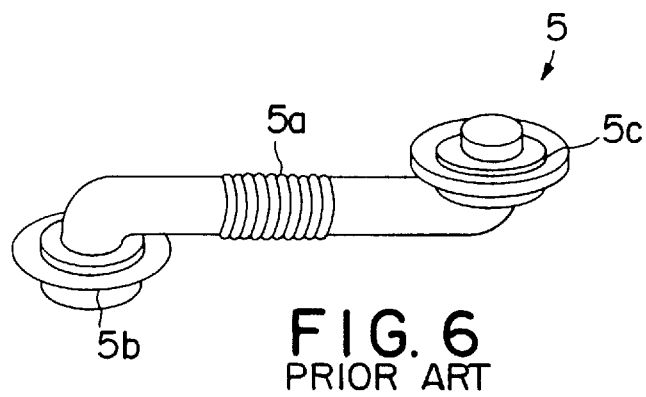
FIG. 6 is a perspective view of a prior art grommet.
Figure 7:
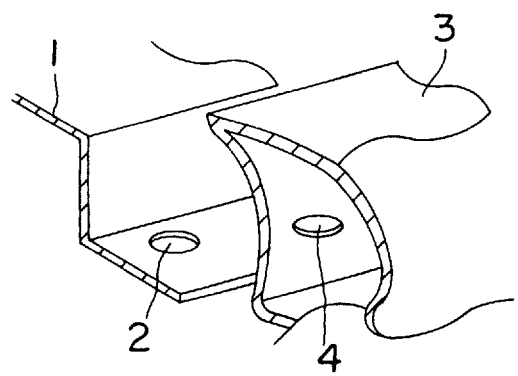
FIG. 7 is a perspective view of a roof panel and a back door frame.
Figure 8:
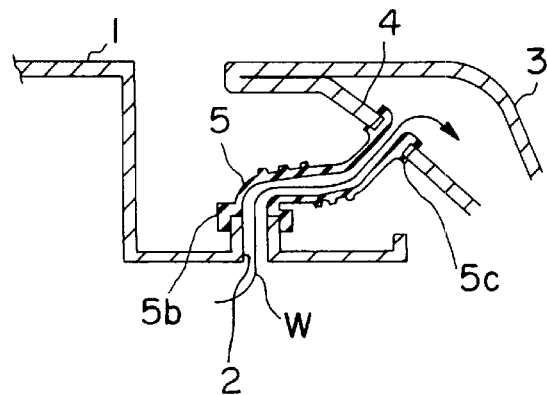
FIG. 8 is a schematic section of an arrangement construction of a wire group using the grommet of FIG. 6.
Figure 9:
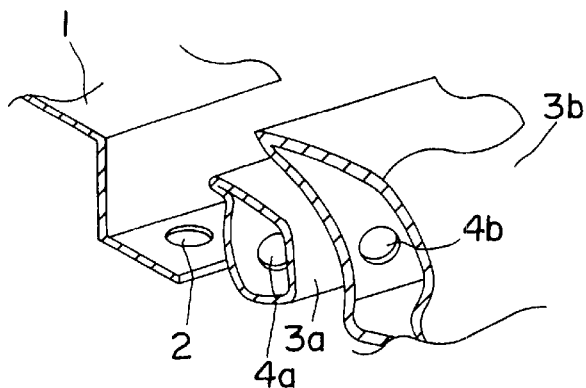
FIG. 9 is a perspective view of a roof panel and a back door frame.
Figure 10:
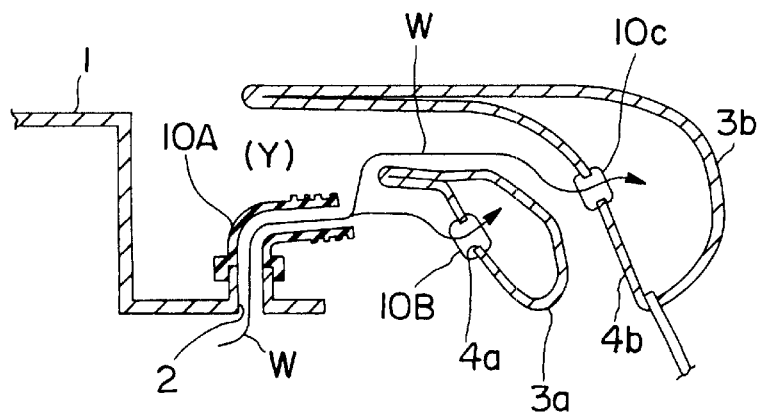
FIG. 10 is a schematic section showing an arrangement construction of a wire group between the roof panel and the back door frame shown in FIG. 9.

FIG. 5 shows a grommet 300 according to a third embodiment. The grommet 300 is constructed as follows. The junction tubes 31a, 31b projecting from the side surface of the main tube 11 and branch tubes 32, 33 have an elliptical cut section. The major axes of the cut sections of the junction tubes 31a, 31b substantially conform to those of the branch tubes 32, 33 and the junction tubes 31a, 31b. The branch tubes 32, 33 are connected via the joint members 35, so that the widening direction (opening direction) of the substantially conical large diameter portion 12 of the main tube 11 conforms to the widening direction (opening direction) of the substantially conical large diameter portions 34 of the branch tubes 32, 33.

The above construction enables the junction tubes 31a, 31b to be connected with the branch tubes 32, 33 in such a manner as to substantially conform the major axes of the junction tubes 31a, 31b of the main tube 11 to the major axes of the branch tubes 32, 33. The grommet 300 can be assembled easily with the conical large diameter portions 34 of the branch tubes 32, 33 widened in the same direction as the conical large diameter portion 12 of the main tube 11. The widening of the conical large diameter portions 34 of the branch tubes 32, 33 in the same direction as the conical large diameter portion 12 of the main tube 11 enhances the ability of the grommet 300 to undergo a deformation as the back door or back door window is opened and closed in a vehicle in which the grommet is used. Thus, the grommet

300 can easily realize a construction during assembling which is suited to being deformed as the back door or back door window is opened and closed.

In the foregoing embodiments, one wire group is arranged from the roof to the hatch-back door while being divided into two wire bundles. However, a branch construction in which the tube through which the wire group is passed or is passable may be branched into three or more tubes and a conical large diameter portion may be formed at the leading end of each of the three branch tubes so that the wire group can be protected from water in the case that it is arranged while being divided into three or more wire bundles.

Furthermore, the cross sections of the main tube, branch tubes and/or portions may be different from circular or elliptical depending upon its/their application, e.g. rectangular, polygonal or the like.

Additionally, the grommet may be adopted or arranged between two parts or members (other than at a back door of a hatch-back type vehicle) that are movable or displaceable with respect to each other, e.g. a door and a body of a vehicle or the like.

What is claimed is:

1. An assembly for providing a routing of electric wires to hinged members for a vehicle body, said assembly comprising:

said vehicle body having a through hole for accommodating a plurality of wires;

said wires extending from the through hole in the vehicle body;

a first member movably disposed in proximity to the vehicle body, the first member having a through hole therein, and at least a first of said wires extending into the through hole of the first member;

a second member movably disposed in proximity to said first member and movably disposed in proximity to said vehicle body, said second member having a through hole therein, and at least a second of said wires extending into the through hole of the second member, an elastomeric grommet for providing waterproof protection for said wires for all ranges of movement of said first and second members, said grommet comprising: a main tube having a widely open first end, a closed second end and a hollow passage extending therebetween, said first end being configured for water-tight connection to said through hole in said vehicle body; first and second branch tubes each having a widely open leading end, a widely open base end and a hollow passage extending continuously therebetween, said base ends of said branch tubes being securely connected to said main tube at a locations between said first and second ends such that the hollow passages of the branch tubes communicate with the hollow passage of the main tube, said leading end of said first branch tube being configured for water-tight connection to said through hole in said first member, said leading end of said second branch tube being configured for water-tight connection to said through hole in said second member, at least said first of said wires being directed from the vehicle body, through the hollow passages of the main tube and the first branch tube and into the first member, and at least the second of said wires being directed from the vehicle body, through the hollow passages of the main tube and the second branch tube and into the second member, said wires and said grommet being dimensioned to provide clearance between said wires within the grommet as the first and second members move.

2. An assembly according to claim 1 comprising a large diameter portion formed at the leading ends of each of the branched tubes, the main tube comprising a large diameter portion at the leading end thereof, the large diameter portions of the grommet being configured for sealing engagement with the respective apertures.

3. An assembly according to claim 1, wherein the main tube and the branch tubes are separately formed, the main tube comprising at least two junction tubes projecting from a side surface, at least two tubular resin joint members having first ends fitted to each of the respective junction tubes, and wherein base ends of the respective branch tubes are fitted around the corresponding resin joint member.

4. An assembly according to claim 3, wherein at least part of said at least two junction tubes projecting from the side surface of the main tube and the corresponding branch tubes have substantially elliptical shapes, and the leading ends of the corresponding branch tubes are widened along a direction substantially normal to longitudinal axes of the branch tubes.

5. An assembly according to claim 1, wherein the main tube comprises a corrugated portion between the first end of the main tube and the branch tubes.

6. A method for arranging an assembly according to claim 1, comprising the steps of connecting the main tube to the vehicle body and connecting the branch tubes to the first member and the second member respectively.

7. A method according to claim 6, wherein the vehicle body is a roof of hatch-back type vehicle, the first member being a back door and the second member being a back door window, the method further comprising the steps of:

arranging the wires from the roof to the back door of the hatch-back type vehicle;

fitting the fit end of the main tube into the through hole formed in the roof;

passing the wires pulled out of the through hole of the roof through the main tube and then pulling the wires out through the widely open leading ends of the two branch tubes while dividing the wires into two wire bundles; and fitting the leading ends of the branch tubes into through holes formed in the back door and said back door window.

8. A method according to claim 7, further comprising the steps of:

separately forming the main tube and the branch tubes;

forming at least two relatively short junction tubes projecting from a side surface of the main tube, providing first and second tubular resin joint members;

fitting one end of the tubular resin joint members each into leading ends respectively of the short junction tubes, and fitting the base end of each respective branch tube around the corresponding joint member.

* * * * *